United States Patent Office 3,533,012
Patented Oct. 6, 1970

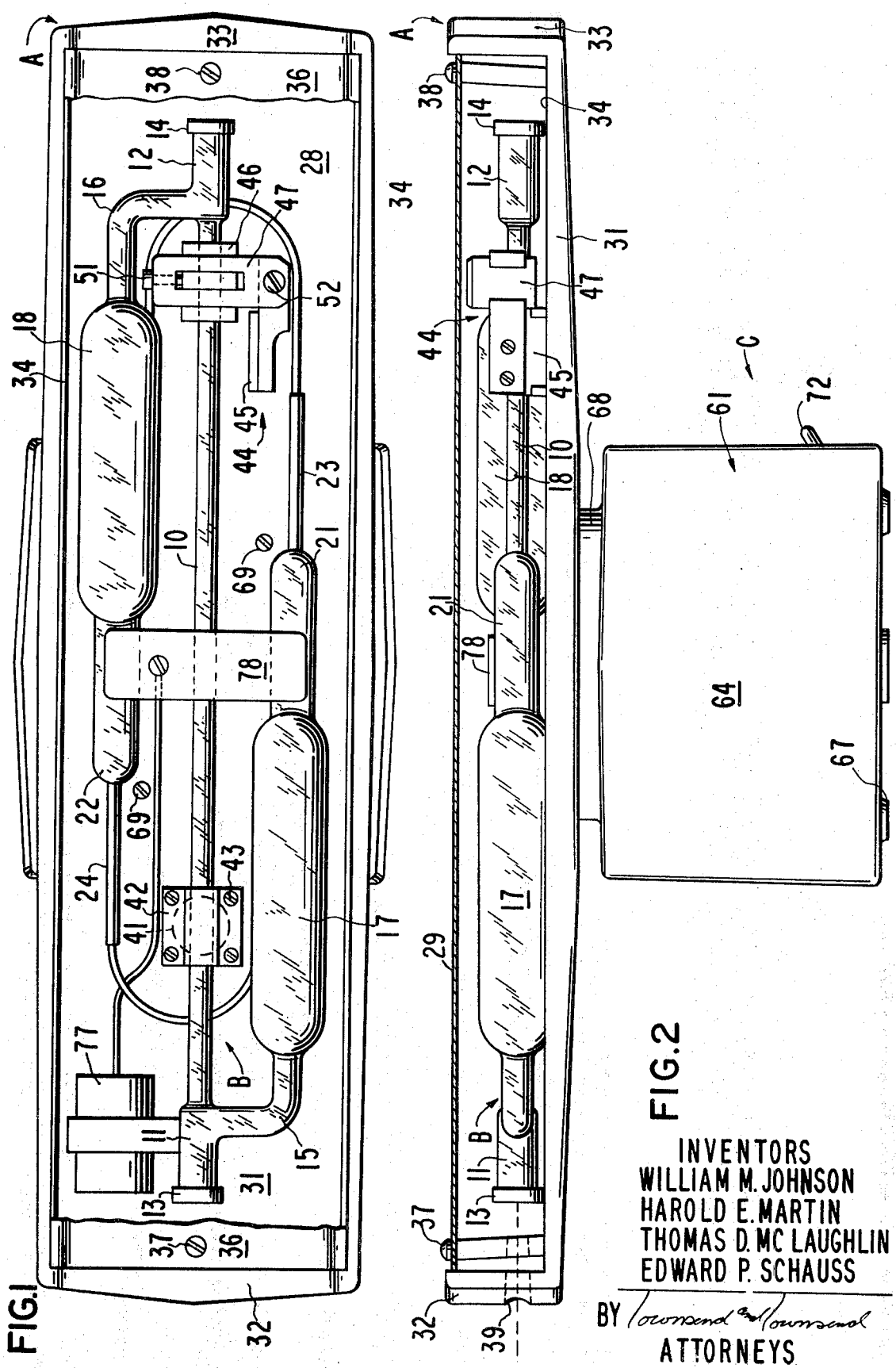

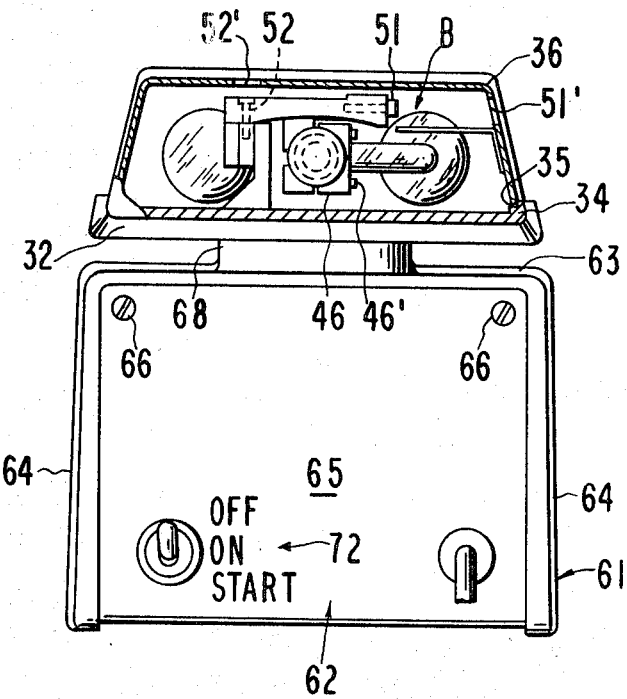
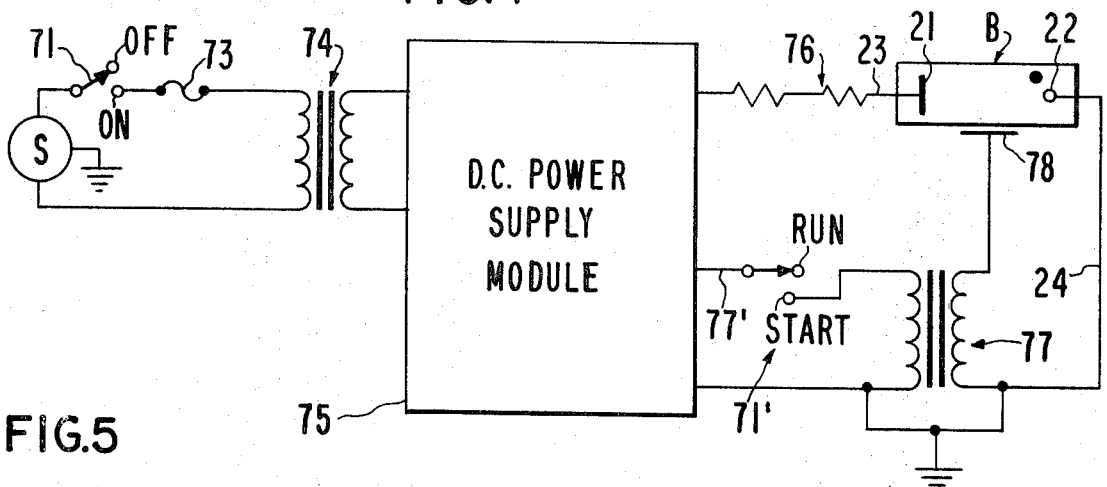
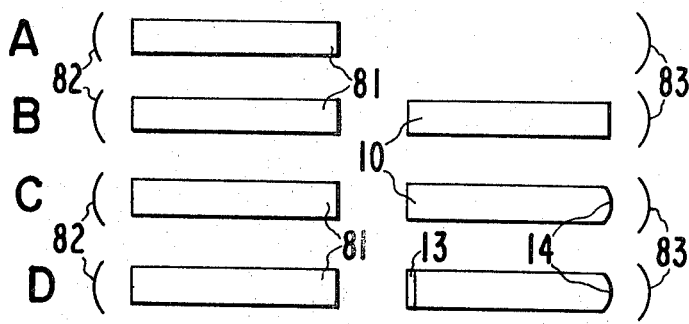

3,533,012
LASER APPARATUS AND METHOD
OF ALIGNING SAME
William M. Johnson, Harold E. Martin, Thomas D. McLaughlin, and Edward P. Schauss, Santa Clara County, Calif., assignors to Optics Technology, Inc., Palo Alto, Calif.
Filed Feb. 10, 1967, Ser. No. 615,125
Int. Cl. H01s 3/00, 3/02, 3/22
U.S. Cl. 331—94.5     1 Claim

ABSTRACT OF THE DISCLOSURE

A method and apparatus for aligning a laser by flexure of an elongate source of emission with reflecting members secured thereto and the structural support for the laser including oppositely facing U-shaped members.

---

The present invention relates in general to lasers and, particularly, to rigidly supported laser apparatus and method of aligning same.

One of the major problems with the production of a commercial laser is the construction of a rigid housing for the laser plasma tube and the proper support and alignment of the reflecting members of Fabry-Perot mirrors for producing multiple reflections of light at a desired frequency within the medium for production of stimulated emission radiation. In the case of gas lasers where the lasing medium is a gaseous material contained within an elongate plasma tube, the problems of mounting the tube with respect to the reflecting members and adjustment of the reflecting members is especially critical since the tube is somewhat fragile and can be subjected to forces that will easily disturb the alignment of the plasma tube between the reflecting members. Great care must be taken in the alignment of the reflecting members and their support and in many cases provision must be made for compensating for changes in the relative position of the lasing medium and the reflecting members due to environmental conditions such as, for example, temperature changes, vibrational disturbances, etc.

In combination with the desirability for easy fabrication of a laser and alignment of the reflecting members thereof, many times it is desired to provide means for adjusting the laser to change the mode of operation of the laser so that upon adjustment radiation can be produced in a different mode.

The object of the present invention is to provide a laser apparatus which can be easily manufactured and assembled and provides a structurally sound assembly.

Broadly stated, the present invention, to be described in greater detail below, is directed to a laser apparatus and method of aligning same wherein the reflecting members are rigidly secured to the lasing material and the lasing material rigidly supported in a stable manner.

In accordance with one aspect of the present invention, a gas laser is provided including an elongate plasma tube which is provided with reflecting members at two opposite ends thereof. The plasma tube is secured to a housing at two spaced apart locations along the length of the plasma tube and at one of the locations, adjustment means is provided for producing minute incremental movement of the plasma tube with respect to the housing thereby to cause flexure of the plasma tube and resultant movement of the relative positions of the reflecting members and the axis of the plasma tube so as to produce a desired adjustment in the operation of the laser.

This construction including internal reflectors and adjustment features avoids the necessity of conventional Brewster angle windows with their attendant cost and alignment problems as well as the attenuation which they add to the system, especially when they have collected dust. Also, since the reflecting members are rigidly connected to the plasma tube, external disturbances such as shock and vibrations and changes in the environmental conditions such as heating of the plasma tube and/or associated hardware acts upon both the plasma tube and reflecting members simultaneously and not independently so that the relative position of the reflecting members with respect to one another and with respect to the plasma tube is not materially altered.

Furthermore, the original alignment of the reflecting members when they are secured to the plasma tube is not so critical that minor misalignments cannot be corrected by flexure of the plasma tube to produce desired alignment of the reflecting members.

Still another feature and advantage of the present invention resides in the fact that flexure of the plasma tube can result in a sufficient change in the optical resonator to change the operating mode of the laser such as, for example, from the primary operating $TEM_{00}$ mode to the $TEM_{01}$ mode so that a single laser device can easily be adjusted to produce an output in more than one mode as desired.

Another aspect of the present invention is provision of a housing assembly for a laser including a power supply housing and a plasma tube housing mounted on the power supply housing. Each of the housings is made up of two interfitting members having U-shaped cross sections with the two members of each housing having their U-shape cross section inverted and rotated 90° with respect to one another whereby the members fit together defining a hollow cavity with each member closing the open faces of the other member. In the power supply housing the upper of the two members is a rigid cast member which is connected centrally of the top surface thereof to the lower surface of a rigid cast member of the plasma tube housing position thereabove. With this construction, an easily assembled rigid housing is provided for both the power supply and the plasma tube and power supply are intimately associated with one another for ease of manufacture, transport and operation. In accordance with one aspect of the invention, the interconnected cast U-shaped members of the two housings are oriented with their U-shaped cross sections arranged at 90° to one another to provide a stable support for the plasma tube. Furthermore, with this construction, the plasma tube is located at an elevated position with respect to the supporting plane at which the entire assembly is placed so that devices to be utilized with the laser beam generated in the plasma tube can be properly positioned and changed relative to the laser beam in the space existing between the elevated location of the plasma tube and the mounting plane. Additionally, the modular construction permits associated apparatus to be positioned beneath the plasma tube housing since the power supply is located only within the central portion of the device beneath the plasma tube housing.

In accordance with still another aspect of the present invention, an elongate plasma tube with auxiliary tubulations, each housing a gas reservoir and an electrode and arranged parallel to the plasma tube, is provided with a trigger electrode plate member spanning the three tubes and secured thereto in close proximity to the electrodes of the auxiliary tubulations. This construction provides a means of triggering the gas discharge in the plasma tube as well as providing support for the free end of the auxiliary tubulations.

In accordance with still another aspect of the present invention, a method is provided for initially aligning the reflecting members rigidly mounted on the ends of the plasma tube of a gas laser. The method in accordance with this aspect of the present invention includes the steps of providing a laser within an optical cavity wherein the first lasing source is spaced a given distance from at least one of the reflecting members establishing the optical cavity. Then the plasma tube of a gas laser being assembled is positioned between the first source and the remote reflecting member in such a position that optical radiation is transmitted from the first source through the plasma tube to the remote reflecting member and reflected back from the remote mirror through the plasma tube to the first source to produce the lasing operation of the first source. Next, a third reflecting member is connected to the end of the plasma tube remote from the first source in such a manner that optical radiation generated at said first source is transmitted through the plasma tube and reflected at the third reflecting member back through the plasma tube to the first source to produce laser operation. Finally, a fourth reflecting member is secured to the end of the plasma tube adjacent the first source in such a position that optical radiation generated in said first source and directed toward the second source is reflected back to the first source by the fourth reflecting member whereby the third and fourth reflecting members are properly optically aligned at the ends of the plasma tube for producing optical coherent radiation by stimulated emission from the plasma tube when subsequently filled with appropriate gas and properly excited.

In accordance with this invention the tolerances achieved by the method of initially aligning and mounting the reflecting members on the plasma tube and then flexure of the tube to change the relative positions of the reflecting mirrors are such as to result in a properly aligned laser. The method is fast and accurate and yet inexpensive.

Other objects, features and advantages of the present invention will become apparent upon reading the following specification and referring to the accompanying drawings in which similar characteristics of reference represent corresponding parts in each of the several views.

In the drawings:

FIG. 1 is a plan view, partially broken away, of a gas laser embodying the features of the present invention;

FIG. 2 is a side elevational view, partially broken away, of the structure illustrated in FIG. 1;

FIG. 3 is a right end view of the structure shown in FIG. 2, partially broken away;

FIG. 4 is a block diagram illustrating the power supply utilized with the laser illustrated in FIGS. 1–3; and FIGS. 5A–D are views schematically illustrating the steps in accordance with the present invention of the method of aligning the reflecting members on the end of a plasma tube.

While a present invention will be described by way of illustrative example with reference to a continuous wave gas laser it will be appreciated that certain novel aspects of this invention can be applied to other types of laser devices such as, for example, pulsed lasers, solid state lasers, etc.

Referring now to the drawings, there is shown in FIGS. 1–3 a CW gas laser incorporating features of the present invention and including a tube housing A containing therein a plasma tube B and mounted on a base or power supply housing C containing the power supply D for the laser.

The plasma tube assembly B includes an elongate capillary or plasma tube 10 provided with enlarged end sections 11 and 12 at opposite ends thereof for mounting reflecting mirrors 13 and 14 to be described in greater detail below. At the enlarged end sections 11 and 12, auxiliary tubulations 15 and 16, respectively, are located providing gas communication between gas reservoirs 17 and 18, respectively, and the ends of the tube 10. Electrode tubulations 21 and 22 are respectively connected to the reservoirs 17 and 18 for housing electrodes (not shown) of conventional construction which are in turn connected to output leads 23 and 24 of the power supply.

The tube housing A includes interleaved base and cover members 28 and 29 respectively. The base member 28 such as cast aluminum includes a base plate 31 provided at opposite ends thereof with upwardly projecting trapezoidal end members 32 and 33. The cross section of the base member 28 is in the form of a U with base plate 31 forming the elongate base connecting portion for the legs of the U which are defined by the end members 32 and 33. An upwardly extending longitudinal side flange 34 extends along the outside edge of the base plate 31 on each side thereof between the end members 32 and 33 and this side flange is provided with a groove 35 on the upper inner edge thereof to receive the lower lip of the cover member 36 having a transverse cross section in the shape of an inverted U positioned normal to the U-shape cross section of the base member thereby to close the sides and top of the base member to define a hollow cavity therein. This cover plate 36 is typically made of spring steel and formed to require inward pressure applied thereto at the free ends of the legs of the U to close the free ends thereof sufficiently so that the free ends are received in the grooves 35 of the base plate 31. This cover plate 36 is held in place by screws 37 and 38 and a beam output aperture 39 is provided in member 32 for passage of the laser beam from within housing A.

A plasma tube B is mounted within the tube housing A at two spaced apart locations along the length of the capillary tube 10. As best illustrated in FIG. 1, the mounting means at one location along the length of tube 10 includes a pedestal 41 cast with the base member 28 and provided with a semi-cylindrical groove in the upper surface thereof to receive the tube 10. A clamping plate 42 provided with a complementary semi-cylindrical groove in the lower surface thereof lies on top of the tube 10 and clamping means such as screws 43 are provided for securing the clamping plate 42 to the pedestal 41 to rigidly secure the tube 10 to base plate 31.

Spaced from pedestal 41 is another mounting assembly 44 including means for providing relative movement between the tube 10 and base plate 31 thereby to cause flexure of the tube 10 and resultant variation in the relative positions of the reflecting mirrors 13 and 14 and the tube 10. The mounting assembly 44 in the form of a gun sight assembly includes a pedestal 45 cast with the base plate 31 and a clamping sleeve 46 rigidly secured to plasma tube 10 such as by screws. The pedestal 45 and clamping sleeve 46 are connected together via a mounting member 47 which is slideably interconnected with members 45 and 46 for movement controlled along two axes by screws 51 and 52. Rotation of one screw 51 changes the relative horizontal position between sleeve 46 and member 47 and, thus, produces horizontal movement of tube 10 at mounting assembly 44 while the other screw 52 provides relative vertical movement between pedestal 45 and member 47 thereby to produce vertical movement of the portion of the plasma tube at the mounting assembly 44.

The position of one end of the plasma tube and, thus, alignment of end reflectors 13 and 14 is adjusted by adjustment of the mounting assembly 44 whereby flexure of the capillary tube 10 is accomplished. The cover plate 36 is provided with an aperture 51' on the side thereof in alignment with screw 51 and an aperture 52' directly above screw 52. These apertures are sized to permit passage of a screwdriver for adjustment of the laser during operation when the cover plate 36 is in place. In this manner, final alignment of the plasma tube 10 is achieved when the tube is mounted in place and adjusting personnel are protected against contact with high voltage.

While the mounting assembly 44 permits relative movement between the plasma tube 10 and the plasma tube housing A, the plasma tube housing A is rigidly supported centrally thereof by the lower power supply housing C. This power supply housing C includes upper and lower members 61 and 62, respectively. Each having a U-shape cross section but which cross sections are rotated 90° with respect to one another so that the two members interleave with one another to define a closed cavity. The upper housing 61 such as cast aluminum includes a top plate 63 and downwardly depending side plates 64. The lower member 62 includes a bottom plate and upwardly extending side plates 65 which extend between the side plate 64 of the upper member adjacent the edges thereof and are held in place such as, for example, by screws 66. The lower plate 62 includes three punch press depending foot pads 67 triangularly oriented to serve as feet for the laser assembly.

The top plate 63 of the upper member includes an integral upper extension 68 with a flat top surface on which the lower surface of the base plate 31 of plasma tube housing A rests. The plasma tube housing A and the power supply housing B areas are connected via screws 69 for rigidly securing the two housings together with the U-shape cross section of the base member 28 of tube housing A positioned at right angles to the U-shape cross section of upper member 61 of power supply housing B so that stability is provided to the plasma tube 10 and to mutually perpendicular directions.

With the plasma tube housing A including the elongate base plate 31 and with the power supply housing B located centrally thereunder, the plasma tube is located a given distance above the mounting plane on which the laser assembly is located for positioning auxiliary equipment to be used with the laser on the same mounting plane. Since the plasma tube housing actually extends far out beyond the power supply housing this auxiliary can include mounting structures which extend beneath the plasma tube housing.

Refer now to FIG. 4, the power supply D for the laser includes a source S such as, for example, a conventional 60 cycle, 110 volt service line connected to the main On/Off switch 71 operated by a mechanical contact switch 72 (see FIG. 3) which besides positions for off and on has a position for start to activitate the triggering electrode via a switch portion 71' ganged thereto for initiating the gas discharge as described in greater detail below. Power from the main On/Off switch 71 is connected via a fuse 73 through a voltage step-up transformer 74 to a D.C. power supply module 75 which supplies high voltage such as, for example 3000 v. D.C. at its output terminals.

Of the output terminals from power supply module 75, one terminal is connected via resistors 76 through lead 23 to one electrode 21 of the plasma tube B, while the other electrode 22 is connected via lead 24 and ground to the other connection of the power supply module 75. A third lead 77' is connected from a charging capacitor in the power supply module 75 through a switch 71' to ground through voltage step-up transformer 77. The other side of transformer 77 is connected between a trigger electrode 78 and electrode 22 and ground.

The trigger electrode 78 is a metallic plate secured such as, for example, by cement to the capillary tube 10 and the two auxiliary tubulations 15 and 16 in the vicinity of electrodes 21 and 22. When the start switch 71' is momentarily operated by depressing start switch 71' to connect lead 77' to the transformer 77, high voltage such as, for example, around 10,000 volts applied to trigger electrode 78 initiates a discharge within the plasma tube B and this discharge is maintained by the normal voltage between leads 23 and 24 supplied from module 75.

The trigger electrode 78 serves the dual function of serving to initiate the discharge within the plasma tube when the laser is turned on as well as to provide support to the tubular elements of the plasma tube. Thus, by means of the trigger electrode 78, the substantially rigid and firmly supported capillary tube can render stability and support to the free and flexible ends of auxiliary tubulations 15 and 16.

While the reflecting mirrors 13 and 14 can be of various typical configurations, mirror 13 is preferably a flat mirror and mirror 14, one with a spherical reflecting surface. These mirrors are cemented in place at the open ends of the enlarged end sections 11 and 12, respectively, of the capillary tube 10. The method in which these reflectors 13 and 14 are secured to the ends of tube 10 is best illustrated in FIGS. 5A–D. Referring now to FIG. 5A, another plasma tube 81 having end windows rather than mirrors is provided with typical reflecting members 82 and 83 with at least one reflecting member 83 spaced a considerable distance therefrom. The source 81 is properly aligned with reflecting members 82 and 83 to provide lasing operation. Next, as illustrated in FIG. 5B, the capillary or plasma tube 10 of the laser being assembled is positioned between source or lasing medium 81 and reflecting member 83 such that light generated in source 81 is transmitted through the tube 10 to mirror 83 and reflected from mirror 83 back through the tube 10 to the source 81 to produce laser operation from source 81. Next, with the tube 10 properly arranged on the axis of the optical cavity for source 81, the reflecting member 14 is placed on the end of tube 10 remote from source 81 so that light generated in source 81 is transmitted through plasma tube 10 and reflected at mirror 14 back through tube 10 to source 81 to maintain lasing action. With this configuration, laser operation of medium 81 indicates that the mirror 14 is properly aligned with respect to the axis of tube 10. Next, the other reflecting member 13, such as the flat mirror, is connected to the end of tube 10 adjacent source 81 and positioned such that lasing operation takes place in source 81 when light generated therein is directed through the near surface of mirror 13, against the far surface and reflected back into source 81. In order for mirror 13 to be aligned with tube 10 by this method, its two surfaces must be parallel. At this point in the assembly of the laser tube, the mirrors 13 and 14 are properly aligned with respect to the tube 10 and one another to provide lasing operation of a gaseous lasing medium contained within tube 10. Any slight misalignment of the reflecting members 13 and 14 can be corrected by flexure of the tube 10 when this tube is mounted within the housing as described above. Naturally, the present invention as described with reference to the method of aligning the reflecting mirrors is fully applicable to solid state and gaseous lasers, both with respect to the source 81 utilized to perform the aligning operation as well as lasing medium 10 on which the mirrors are being aligned.

What is claimed is:

1. The method of aligning reflecting mirrors on the ends of a source of coherent-radiation generating material comprising the steps of placing a source of lasing material between first and second spaced apart reflecting members; positioning an elongate second source for lasing between said first source and one of said first and second reflecting members so that light generated in said first source will be transmitted through said second source to said one reflecting member and reflect back through said second source for lasing action of said first source; mounting a third reflecting member on the end of said second source remote from said first source and reflecting with said third reflecting member light generated at said first source back to said first source for lasing action of said first source; and mounting a fourth reflecting member on the end of said second source adjacent said first source and reflecting with said fourth reflecting member light generated by said first source back to said first source for lasing action of said first source whereby said third and fourth reflecting members are mounted on opposite ends of said second source for generating coherent radiation by stimulated emission within said second source.

References Cited

"Portable Laser," Instruments and Control Systems, vol. 38, No. 3, March 1965, p. 186.

Large et al.: "A Compact Pulsed Laser for the Far Infrared," Applied Optics, 4 (5), May 1965, pp. 625–6.

"Laboratory Laser," Instruments and Control Systems, 38 (10), October 1965, p. 78.

"Low Priced, C-W Laser is Rugged, Reliable," Laser Focus, Dec. 15, 1965, pp. 18–19.

"How to Measure the Wavelength of Light With a Ruler (and Our New $295 Laser)," in the advertising sections of Am. J. of Physics, 33 (12), December 1965, 2 pp.

"$295 Gas Laser," Physics Today, December 1965, p. 83.

"Everyman's Laser for Classroom and Industry," Electronics, 39 (2), Jan. 24, 1966, pp. 141 and Table of Contents.

RONALD L. WILBERT, Primary Examiner

R. J. WEBSTER, Assistant Examiner

U.S. Cl. X.R.

D26—14